Feb. 12, 1946.  A. E. GRANT  2,394,763
JUICE EXTRACTOR
Filed June 15, 1945

INVENTOR.
Albert E. Grant
BY
Thos. E. Scofield
ATTORNEY

Patented Feb. 12, 1946

2,394,763

UNITED STATES PATENT OFFICE 2,394,763
JUICE EXTRACTOR

Albert E. Grant, Kansas City, Mo., assignor to John C. Hockery, Foster L. Talge, and Henry J. Talge, doing business as Rival Manufacturing Company, Kansas City, Mo.

Application June 15, 1945, Serial No. 599,559

8 Claims. (Cl. 100—42)

This invention relates to improvements in juice extractors and refers more particularly to extractors of the rack and pinion type wherein a presser head is raised and lowered into and out of squeezing relationship with a stationary reamer. In the instant invention the presser head is rocked backwardly when in a raised position to facilitate access to the reamer, when fruit is to be squeezed and the pulp removed after squeezing. Novelty resides primarily in the construction which makes possible both vertical reciprocation and rocking of the presser head during the extraction operation. The device is adapted for use in homes and commercial establishments such as soda fountains, bars and the like.

In conventional extractors of this type the presser heads are moved vertically only and even in a raised position interfere to some extent with easy placement of fruit on the reamer and removal of the rind and pulp therefrom. For convenient operation these devices require long racks capable of raising the presser heads to an appreciable height above the reamer. Furthermore, the long racks of the extractors do not lend themselves to inexpensive and attractive construction. In addition, to raise the presser head usually one or more revolutions of the actuating handle are required to raise or lower the presser head.

One object of this invention is to provide a juice extractor having a rockable presser head which facilitates application of the fruit to the reamer and removal of the rind therefrom.

Another object is to provide a juice extractor in which the presser head is raised from the reamer and rocked on a pinion by rotation of an actuating handle.

A further object is to provide a juice extractor in which the presser head is raised from the reamer and rocked backwardly therefrom by rotation of an actuating handle through less than one revolution.

Still another object is to provide a rugged quickly operated juice extractor.

Other and further objects of this invention will appear from the following description.

In the accompanying drawing which forms a part of the instant specification and are to be read in conjunction therewith and in which like reference numerals are used to indicate like parts in the various views.

Figure 1:
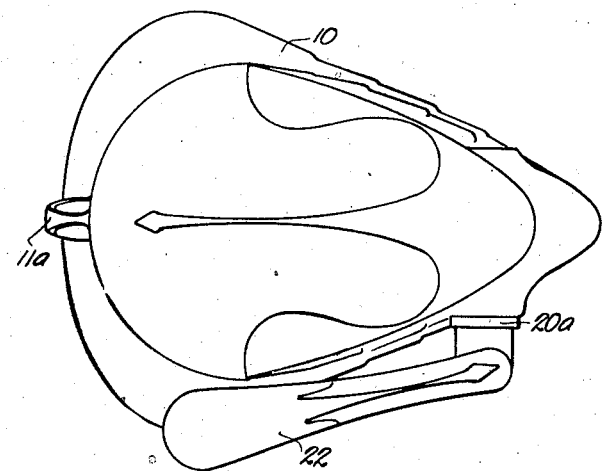
Fig. 1 is a top plan of a juice extractor embodying the invention.

Referring to the drawing the numeral 10 designates a standard or housing having a removable cup 11 with handle 11a insertable in the front of the standard for receiving the juice. The lower presser member or reamer 12 positioned within a cup 13 is carried upon support 14 within the standard. Cup 13 has a central drain not shown in the drawing. Coacting with the reamer is a presser head 15 having an inner inverted presser cup 16 which is adapted to be raised and lowered out of and into squeezing relationship with the reamer.

Figure 3:
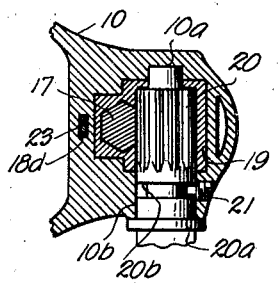
Fig. 3 is a view taken on the line 3—3 in Fig. 2 in the direction of the arrows.

The presser head is supported on a rack 17, vertically slidable and rockable in the standard. The mounting of the rack within the standard comprises a lower stationary member formed integrally within the standard. This stationary member or support includes a lower slide 18a, a recess 18b in its front wall for receiving the lower end of the rack and a rear bearing portion 18c. A rockable support 19 for the rack is carried by the bearing portion 18c. This support has a central slideway in which the rack reciprocates. This support is transversely bored to receive pinion 20 which meshes with the teeth cut in the rear of the rack. The mounting of the pinion in the standard is detailed in Fig. 3 and includes bearings 10a and 10b, a collar 20a and a holding screw 21 which fits a groove 20b in the shaft. An actuating handle 22 is mounted on the end of the pinion shaft. It is to be noted that the bottom portion of recess 18b is arcuate in cross section and is struck on a radius from the axis of the pinion.

Figure 2:
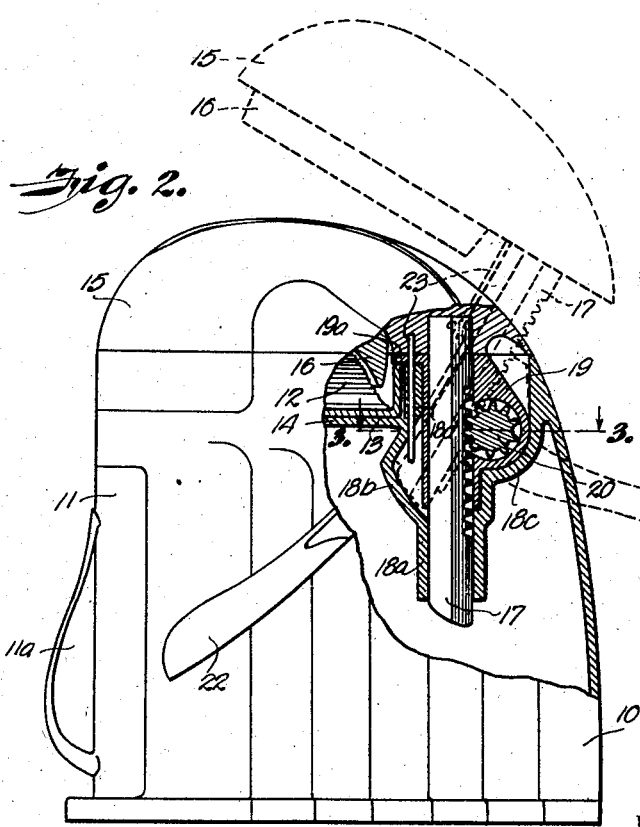
Fig. 2 is a side elevation of the juice extractor with the actuating mechanism shown in section.

Vertical reciprocation and rocking of the presser head are effected on actuation of handle 22 and rotation of pinion 20. The raising or lowering of the presser head depends on the direction of rotation of the handle. To rock the presser head, when in a raised position, the teeth of the rack are discontinued short of its lower end so the pinion runs the course of the rack teeth when the lower end of the rack reaches recess 18b. Continued actuation of the handle and pinion, when the rack is in this position, rocks the rack upon the pinion as a pivot to its dotted line position in Fig. 2.

A locking assembly is provided to hold the central slideway of the rockable support 19 in registration with the fixed slideway 18a thus preventing binding of the rack during its reciprocation. The locking assembly comprises a flange 19a at the upper forward edge of support 19. The aperture of the flange registers with a vertical passage 18d in the upper forward portion of the stationary slide member when the slideway of the support is in a vertical position. A locking pin 23 fastened to and depending from the presser head extends through the hole in the flange and when the holes are brought into registration by rocking of the support to a vertical position the locking pin fits into the duct 18d. Thus when the presser head is lowered the locking pin holds the support slideway and the stationary slideway 18a in continuous registration reducing frictional contact of the rack with the two slideways. When the presser head is raised the locking pin moves with the head and is withdrawn from passage 18d to release the rockable support. The length of the locking pin is such that it is withdrawn from duct 18d as the lower end of rack 17 reaches recess 18b.

The flange 19a extends slightly beyond the upper edge of the stationary member locking the removable cup 13 in position. Thus when the presser head is raised the suction which sometimes is created does not dislodge the cup 13. However, when the presser head and rockable support are tipped backwardly the flange is raised from the cup. In this position the cup may be readily removed for cleaning.

It is believed that the operation of the juice extractor is obvious from its description. The extractor when closed is in the position shown in full lines in Fig. 2. When fruit is to be squeezed handle 22 is rotated to the dotted line position shown in Fig. 2 rotating the pinion 20 approximately through an arc of 270° at which time the presser head is in the dotted line position. In this cycle rotation of the pinion first raises rack 17 elevating the presser head vertically until the lower end of the rack reaches the recess 18b. At this point locking pin 23 is withdrawn from duct 18d releasing the support 19 permitting it to be rocked about the pinion as a pivot. This is accomplished as the pinion reaches the end of the rack teeth. Continued rotation of the handle and pinion rocks the support, rack and presser head to their dotted line position in Fig. 2 until the rearmost portion of the support 19 abuts the upper rear edge of the standard limiting further rearward rocking movement. In the rocked position the bottom of the recess snugly fits the lower end of the rack holding the rack in place relative to the pinion. With the presser head thus tipped back the reamer is more easily accessible, either to insert fruit or to remove the rind. The fruit to be juiced is then placed on reamer 14 and handle 22 is rotated in a reverse direction. On reversal of the direction of rotation of the handle the inclination of the bottom of the recess causes the support, rack and presser head to rock back into a vertical position at which time locking pin 23 enters duct 18d and continued rotation of the handle lowers the presser head squeezing the fruit between the head and reamer. The locking pin keeps the slides of the support and stationary member in registration and prevents binding of the rack. When the fruit has been squeezed rotation of the handle is again reversed and the presser head raised and tilted back to the dotted line position. The fruit rind can then be easily removed from the reamer and the juice taken from the extractor by removing cup 11 from the standard.

Figure 4:
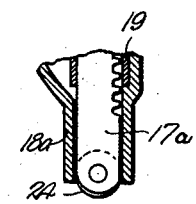
Fig. 4 is a view showing a modified form of rack.

In the modification shown in Fig. 4 the beveled end of the rack 17a has a roller 24 extending below its bottom and through the front of the rack. This roller reduces friction between the rack and stationary slideway and the rack and the bottom of the recess.

It will be seen that the objects of this invention have been accomplished. There has been provided a fruit juice extractor in which the presser head is raised and rocked backwardly to facilitate access to the stationary reamer by turning the actuating handle through less than one revolution. The construction provides an elongated rigid slideway for the application of pressure during the squeezing operation and a rockable slideway when the presser head is in a raised position. The arrangement facilitates the placing of fruit on the reamer and the removal of the rind therefrom after the squeezing operation has been performed.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawing is to be interpreted as illustrative and not in a limiting sense.

Having thus described my invention I claim:

1. A juice extractor comprising a base having a recess therein, a rack and pinion mechanism and a rockable support operable in the recess, and a head mounted on the rack, said pinion being mounted in the rockable support and said recess having an inclined wall, the rack adapted to be reciprocated by said pinion and to be rocked by said pinion so that a part thereof is engageable with the inclined wall.

2. A juice extractor as in claim 1 in which the teeth on the rack are discontinued short of the lower end whereby raising of the presser head by rotation of the pinion locks the rack to the pinion and causes the rack to swing about an arc with the axis of the pinion as a center.

3. A juice extractor as in claim 1 in which the inclination of the wall is such as to hold the rack and pinion in the same relative positions when the rack is rocked.

4. In a juice extractor of the rack and pinion type wherein a presser head is both reciprocated and rocked on the pinion as a pivot while being raised and lowered into and out of squeezing relationship with a stationary reamer, a mounting for the rack comprising a stationary slide member and a rockable support bearing therein, a recess in the wall of the stationary member adjacent the lower end of the rockable support, said recess adapted to receive the end of the rack as it rocks upon the pinion as a pivot during its upward and rearward movement.

5. A juice extractor as in claim 4 wherein the support has a slideway therein, a locking means associated with the presser head for preventing rocking of the support slideway when the lower end of the rack is below the recess in the stationary slide member, the locking means being released when the lower end of the rack reaches said recess.

6. A juice extractor as in claim 4 wherein a locking pin depends from the presser head, the rockable support and stationary member having registering holes for receiving the pin to prevent rocking of the support when the lower end of the rack is below the recess in the stationary member, said pin being withdrawn from the holes in the slide member and rockable support when the end of the rack is raised to a position with relation to the recess to release the support.

7. A juice extractor as in claim 4 in which the teeth on the rack are discontinued short of the lower end whereby raising of the presser head by rotation of the pinion rocks the rack on the pinion as a pivot when the lower end of the rack reaches the recess.

8. A juice extractor as in claim 4 wherein a removable cup in the standard supports the reamer and a flange on the rockable support extends over the upper edge of the removable cup locking it in position during vertical reciprocation of the presser head and is raised therefrom releasing the cup on rocking of the presser head.

ALBERT E. GRANT.